UNITED STATES PATENT OFFICE.

WILLIAM H. BUTLER, OF CHICAGO, ILLINOIS.

IMPROVEMENT IN PROCESSES FOR CLEANING COFFEE.

Specification forming part of Letters Patent No. 122,306, dated January 2, 1872.

SPECIFICATION.

I, WILLIAM H. BUTLER, of Chicago, in the county of Cook and State of Illinois, have invented certain Improvements in the Process of Cleansing Coffee, of which the following is a full, clear, and exact description to enable those skilled in the art to employ the same.

Coffee transported by sea-going vessels is apt to become injured by exposure to dampness from the sea-water, and, in fact, dampness of any kind is likely to injure it by inducing a growth of microscopic funguses and mold, which, although it does not affect the interior of the kernel, yet renders the coffee useless unless removed, because the beverage made from the kernel so affected invariably has a disagreeable moldy taste, and is positively deleterious to health. Coffee exposed to damp and then to dust also frequently becomes covered with close-adhering dirt, and is spotted, discolored, unsalable, and unfit for use. The object of my invention is to provide a means whereby the coffee affected as above may be perfectly and thoroughly scoured and cleansed, and rendered perfectly sweet and good, at small expense, and without the use of chemicals or drugs, which must, in the very nature of things, be injurious; and my invention consists in agitating the coffee in a vessel, cylinder, or other appropriate machine or mechanism with sand placed in with the said coffee.

I usually employ a hollow drum or cylinder, in which the coffee is placed, together with a proper quantity of sand—say, for example, equal parts in weight. The coffee and sand are then agitated by the revolution of the cylinder, and the coffee thus scoured and cleansed by the attrition of the sand. Any ordinary vessel of proper construction may be employed in which to agitate the coffee and sand. I do not claim to have invented any particular mechanism for this purpose. The cylinder above mentioned may, however, be employed, and it may be constructed with arms made stationary to the shaft extending through the drum, and which will assist to agitate and stir the contents thereof.

After the coffee is thoroughly cleansed and denuded of the coating of funguses, mold, or dirt, it may be passed over a screen or sieve, when the sand and dirt will escape and be blown away by a blast-fan or other contrivance, leaving the coffee bright, clean, and wholesome.

I do not limit myself to the employment of sand exclusively, as many other substances of a like silicious nature may be used with like effect, as, for instance, emery in grain, broken glass finely powered, and many others of like nature equivalent to sand; but I employ usually sand, as it is the cheapest and answers the purpose best.

Having described my invention, I claim and desire to secure by Letters Patent—

The process of cleansing or scouring coffee above described, consisting of the agitation of the coffee together with the sand in a vessel, whereby the coffee is cleansed by attrition against the sand, substantially as specified.

W. H. BUTLER.

Witnesses:
J. W. MUNDAY,
H. F. BRUNS.

(57)